United States Patent [19]

Gernhardt et al.

[11] Patent Number: 5,320,395
[45] Date of Patent: Jun. 14, 1994

[54] MICROCONICAL INTERFACE FITTING AND INTERFACE GRASPING TOOL

[75] Inventors: Michael L. Gernhardt; William D. Wightman, both of Houston; Alistair P. Johnston, Webster, all of Tex.

[73] Assignee: Oceaneering International, Inc., Houston, Tex.

[21] Appl. No.: 951,581

[22] Filed: Sep. 25, 1992

[51] Int. Cl.⁵ .................... B25J 15/10; B64G 1/64
[52] U.S. Cl. ..................... 294/86.4; 244/161; 294/113; 901/30; 901/39
[58] Field of Search ............ 294/1.1, 16, 82.24–82.28, 294/82.32, 86.1, 86.26–86.33, 86.4, 90, 110.1, 113–116, 906; 244/158 R, 161; 403/345, 360, 375; 901/30, 31, 36–39

[56] References Cited

U.S. PATENT DOCUMENTS

| | | | |
|---|---|---|---|
| 2,263,910 | 11/1941 | Williams | 294/86.31 X |
| 2,924,483 | 2/1960 | Koch et al. | 294/86.4 |
| 3,319,992 | 5/1967 | Stephens | 294/906 X |
| 3,782,838 | 1/1974 | Tiraspolsky et al. | 294/86.1 X |
| 4,476,086 | 10/1984 | Kerz | 294/86.3 X |
| 4,585,369 | 4/1986 | Manesse et al. | 294/86.33 X |
| 4,929,011 | 5/1990 | Vandersluis | 294/86.4 |
| 5,131,705 | 7/1992 | Gluck et al. | 294/82.32 |

FOREIGN PATENT DOCUMENTS

| | | | |
|---|---|---|---|
| 363242 | 4/1990 | European Pat. Off. | 244/161 |
| 2502600 | 10/1982 | France | 294/90 |
| 1525110 | 11/1989 | U.S.S.R. | 294/90 |

Primary Examiner—Johnny D. Cherry
Attorney, Agent, or Firm—Kurt S. Myers

[57] ABSTRACT

A small and light weight microconical interface fitting may be attached to the surface of a space vehicle or equipment to provide an attachment device for an astronaut or robot to capture the space vehicle or equipment. The microconical interface fitting of the present invention has an axisymmetrical conical body having a base portion with a torque reaction surface for preventing rotation of the interface grasping tool; a cavitated, sunken or hollowed out intermediate locking portion which has a cavity shaped for receiving the latches of the grasping tool and an upper guiding portion for guiding the grasping tool into axial alignment with the microconical interface fitting. The capture is accomplished with an interface grasping tool. The grasping tool comprises an outer sleeve with a handle attached, an inner sleeve which may be raised and lowered within the outer sleeve with a plurality of latches supported at the lower end and a cam to raise and lower the inner sleeve. When the inner sleeve is at its lowest position, the latches form the largest diameter opening for surrounding the microconical fitting and the latches form the smallest diameter or a locking, grasping position when raised to the highest position within the outer sleeve. The inner sleeve may be at an intermediate, capture position which permits the latches to be biased outwardly when contacting the microconical fitting under very low forces to grasp the fitting and permits capture (soft docking) without exact alignment of the fitting and the tool.

19 Claims, 7 Drawing Sheets

MICROCONICAL INTERFACE FITTING AND INTERFACE GRASPING TOOL

The invention described herein was made in the performance of work under NASA Contract No. NA9-18200 and is subject to the provisions of Section 305 of the National Aeronautics and Space Act of 1958 (42 U.S.C. 2457).

FIELD OF THE INVENTION

The present invention is directed to a microconical interface fitting or attachment device. More specifically, the present invention is directed to a microconical interface fitting (MCF) which may be attached and secured to a space vehicle or space equipment for the easy capture or securing of the satellite or equipment in space by an astronaut or a robot and the interface grasping tool operated by the astronaut or robot to capture and secure the microconical interface fitting attached to the vehicle or equipment.

The preferred grasping tool of the present invention comprises an outer sleeve which has a handle attached for holding the grasping tool; an inner sleeve which is raised and lowered within the outer sleeve; and a cam means which raises and lowers the inner sleeve.

BACKGROUND OF THE INVENTION

U.S. Pat. No. 1,471,094 discloses a crane hook. There is no latching method shown that incorporates anti-rotation or a soft docking or latching option.

U.S. Pat. No. 4,929,011 discloses a grapple fixture for use with an end effector having grappling capabilities and latching capabilities and which may include a force moment sensor which can cooperate with the arm in order to align the end effector with the grapple fixture without the aid of a grappling mechanism. This grapple fixture requires a large footprint or square area on the space station or satellite and provides no alignment for the bending reaction during insertion.

U.S. Pat. No. 4,955,654 discloses an end effector secured to the front end of a manipulator. The force (or torque) applied to the end effector at the time of clamping the dedicated object is detected so that a driving portion of the end effector is feedback-controlled in order to protect the end effector from an applied force (or torque) exceeding a predetermined level. The microconical fitting and the grasping tool of the present invention overcome one of the problems not addressed in systems heretofore proposed for space which is soft dock, alignment and hard dock in a single weight efficient mechanism. Alignment in space is more difficult than on earth which, because of gravity, provides numerous and consistent load reaction options. The astronaut does not have the same stabilizing capabilities of spatial relationships and especially for alignment in space as are found on earth. The grasping tool and fitting of the present invention do not require exact alignment but allow soft docking or soft capture to occur without perfect initial alignment. During locking or complete securing, alignment is completed and the grasping tool is locked against the microconical fitting.

SUMMARY OF THE INVENTION

The microconical interface fitting of the present invention consists of an axisymmetrical conical body having a base portion with a torque reacting surface for preventing rotation of the interface grasping tool; a cavitated, sunken or hollowed out intermediate locking portion which has a cavity shaped for receiving the latches of the grasping tool and an upper guiding portion for guiding the grasping tool into axial alignment with the microconical interface fitting. Preferably, the upper portion is truncated and an access opening extends into the microconical interface. Further, the edge of the upper surface is beveled.

The small and light weight microconical interface fitting may be attached to the surface of a space vehicle or equipment to provide an attachment device for an astronaut or robot to capture the space vehicle or equipment. The capture is accomplished with an interface grasping tool. The grasping tool is comprised of an outer sleeve with a handle attached, an inner sleeve which may be raised and lowered within the outer sleeve with a plurality of latches supported at the lower end and a cam to raise and lower the inner sleeve. When the inner sleeve is at its lowest position, the latches form the largest diameter opening for surrounding the microconical fitting and the latches form the smallest diameter or a locking, grasping position when raised to the highest position within the outer sleeve. The inner sleeve may be at an intermediate, capture position which permits the latches to be biased outwardly when contacting the microconical fitting under very low forces to grasp the fitting and permits capture (soft docking) without exact alignment of the fitting and the tool.

BRIEF DESCRIPTION OF THE PREFERRED EMBODIMENTS

Figure 1:
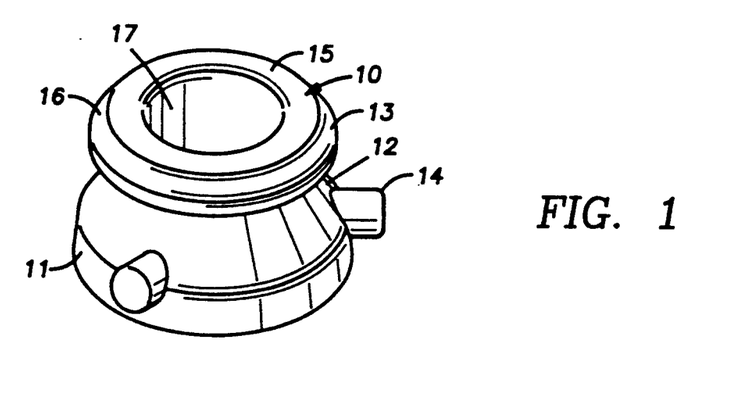
FIG. 1 is an isometric view of the microconical interface fitting of the present invention.

Referring to FIG. 1, the microconical interface fitting 10 is an attachment device especially suited for the capturing of space satellites or equipment using robotics or astronaut extra vehicular activity (EVA). At a weight of less than ¼ pound (lb), several fittings 10 may be attached to a space satellite or vehicle in locations which are accessible to facilitate capture. Another specific example may be to secure the astronaut by having a platform and shoe secured to the tool which is then secured to a microconical fitting on the space vehicle or space station. The fitting and tool may be part of the structure which interlocks and produces further structure similar to a scaffold for a structure on earth. The fitting 10 may also be used as a connection or securing attachment device in services other than on space vehicles or equipment in space.

The microconical interface fitting 10 has an axisymmetrical conical body having a base portion 11, a cavitated intermediate portion 12 and an upper guiding portion 13. The microconical interface fitting is preferably made from a high strength, light weight, alloy metal.

The base portion 11 of the fitting 10 has a torque reaction surface illustrated by several protrusions 14, preferably three, which extend perpendicularly from the axis of the fitting 10. The preferred protrusions 14 are pins which are forced fit into three openings or machined as one piece with the body, each spaced about 120° from each other and which are perpendicular to the axis of the fitting 10. Alternately, the torque reaction surface may be indentions or dimples in the base portion 11, the number of which is one or greater. Friction or friction devices are means to provide a torque reaction surface. The use of the term "torque reaction surface" will be more fully described and understood with reference to the interface tool which is set forth in more detail hereinafter.

The intermediate portion 12 of the fitting 10 is cavitated, sunken or hollowed out to receive the plurality of latches of an interface tool, which will be described in more detail hereinafter. The cavitated, sunken or hollowed out portion 12 has a reduced diameter than the base portion 11 and terminates with the lower surface of the upper portion 13 of fitting 10. The shape of the cavitated, sunken or hollowed out portion 12 will accommodate the shape of the latches of the grasping tool.

The guiding upper portion 13 of the fitting 10 is preferably truncated by a surface 15 substantially perpendicular to the axis of the fitting 10. Further, the edge of the surface 15 is beveled to form a beveled surface 16. As will be described in more detail hereinafter, the latches of the interface tool will contact the upper portion 13 of the fitting 10 and be guided over the upper portion 13 until the tool surrounds the base 11. The protrusions or pins 14 engage one of the torque surfaces to prevent rotation of the tool with respect to the fitting 10.

Figure 2:
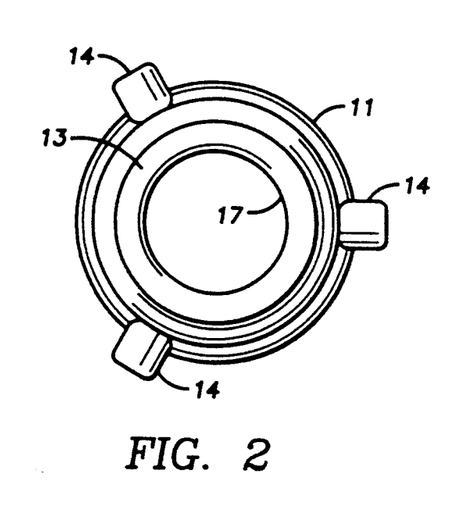
FIG. 2 is a top view of the microconical interface fitting of the present invention.

Referring to FIG. 2, the microconical interface fitting 10 has an axial opening 17 which extends into the fitting 10. This opening 17 may extend through the fitting 10 and be used as a passage to the space satellite or vehicle (not shown) or a piece of equipment (not shown) to which the fitting 10 is attached or as an opening to hold a guiding tool for aligning the tool with the fitting 10 or as an access to a tool or connecting piece on the end of a robot arm. The opening 17 may be used as access for a fluid, for fuel for example, or for an electrical connection.

Figure 3:
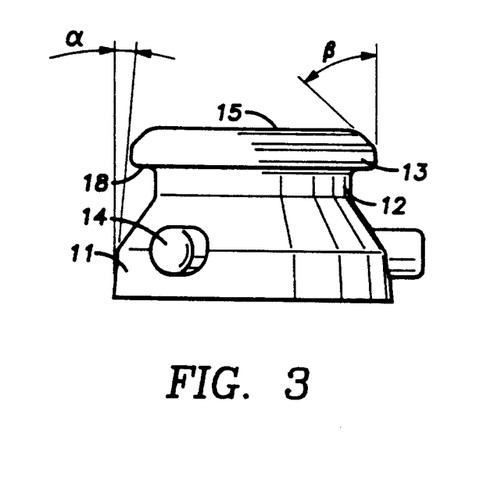
FIG. 3 is a side view of the microconical interface fitting of the present invention.

Referring to FIG. 3, the conical shape of the fitting 10 is clearly shown by the outer surfaces of the base portion 11 and the upper portion 13 and the angle $\alpha$, which is preferably about 5°. The beveled surface 16 is also clearly shown by the angle $\beta$, which may range between 30° and 45°. The intermediate portion 12 and the upper portion 13 each terminate in the locking surface 18 which is perpendicular to the axis of the fitting 10.

Figure 4:
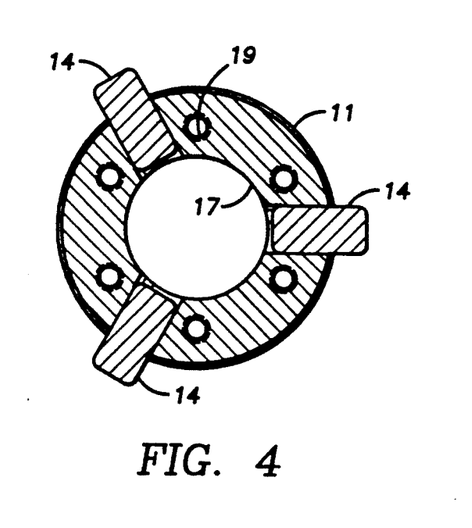
FIG. 4 is a cross-sectional bottom view of the microconical interface fitting of the present invention.
Figure 5:
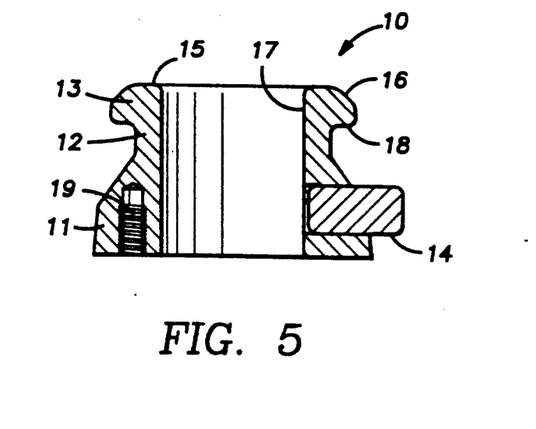
FIG. 5 is a cross-sectional side view of the microconical interface fitting of the present invention.

Referring to FIG. 4, one way in which the fitting 10 may be attached to the structure is by the threaded openings 19 shown. Preferably, there are six substantially equally spaced openings 19. The fitting 10 may thus be attached to a space vehicle, space equipment or any other structure to which the fitting 10 is attached by screws. Alternatively, the fitting 10 may be attached by integral machining, welding or by any other means providing satisfactory anti-rotation of the fitting 10. It is shown in FIG. 5 that the protrusions or pins 14 are in the base portion 11 of the fitting 10 but may extend in part into the intermediate portion 12. Alternately, while protrusions or pins 14 are illustrated to provide anti-rotation, indentions or cavities, either single or continuous, may be used to provide anti-rotation.

The microconical interface fitting 10 of the present invention may be used with different tools and for other uses than space satellite or vehicle capture; however, the small size and weight of the fitting 10 is unique for a space attachment device.

Figure 6:
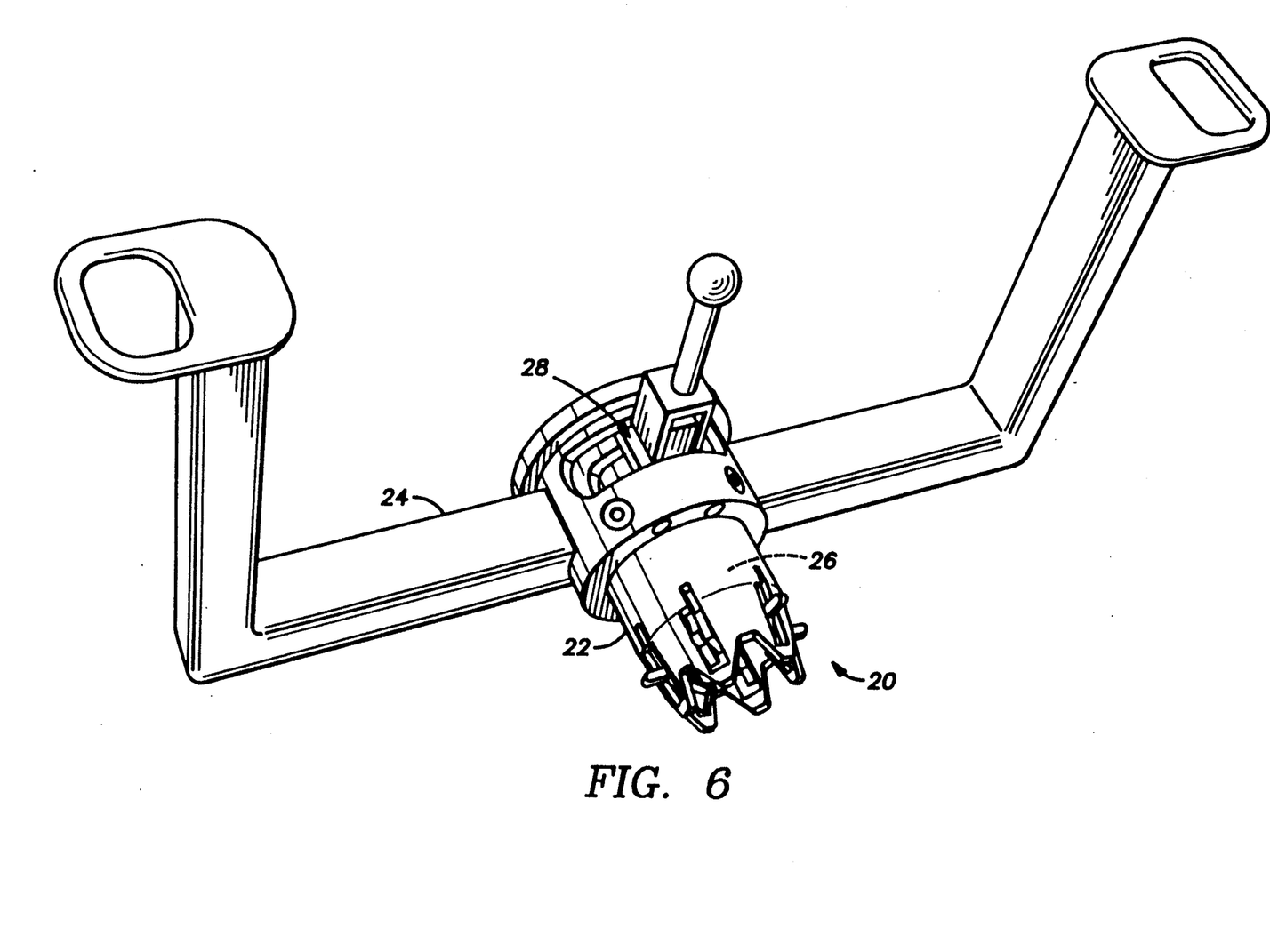
FIG. 6 is an isometric view of the grasping tool of the present invention.

Referring now to FIG. 6, the preferred grasping tool 20 of the present invention comprises an outer sleeve 22 which has a handle 24 attached for holding the tool 20; an inner sleeve 26 which is raised and lowered within the outer sleeve 22; and a cam assembly means 28 which raises and lowers the inner sleeve 26 within the outer sleeve 22.

Figure 7:
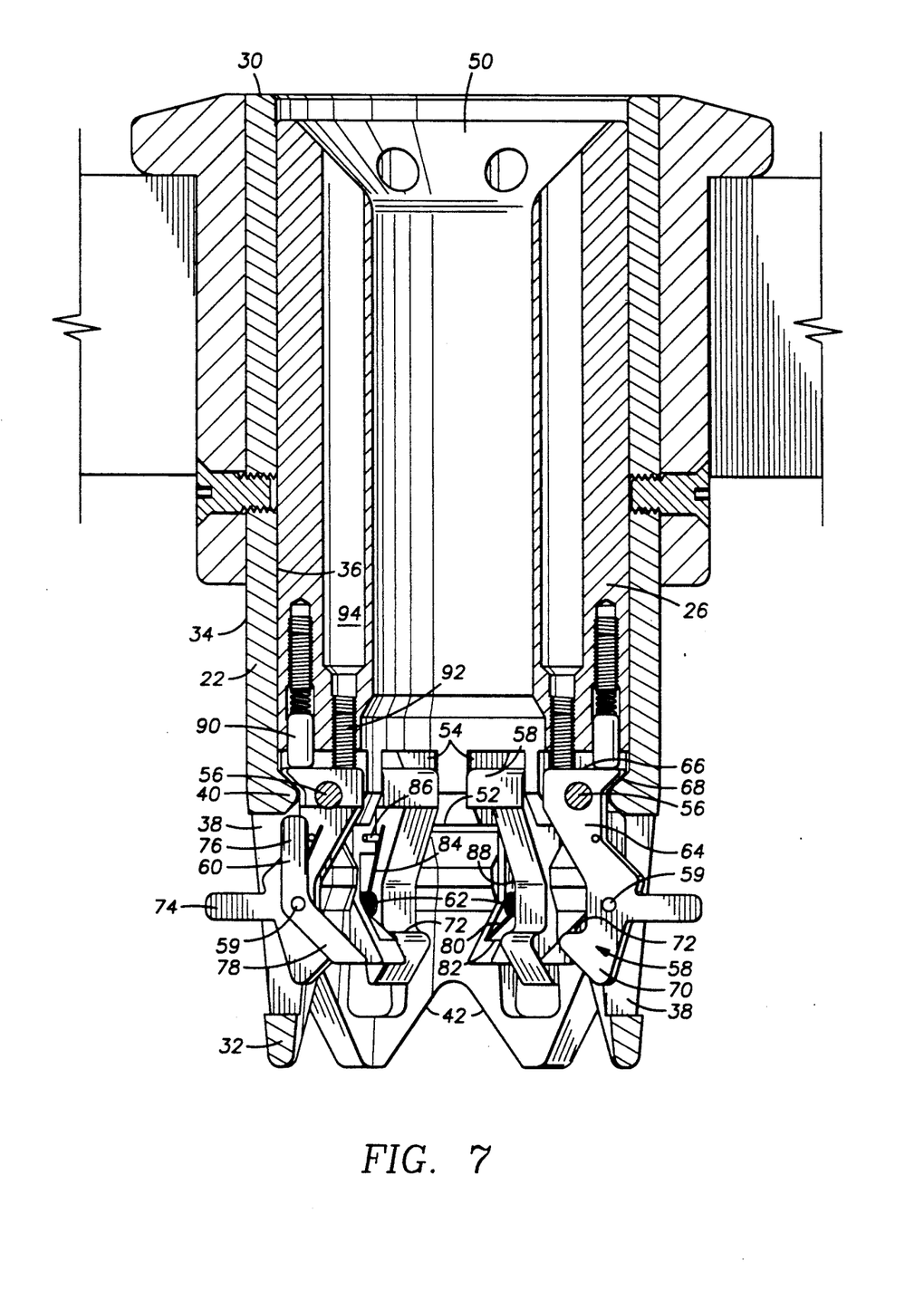
FIG. 7 is a cross-sectional side view of the interface tool showing the details of the inner sleeve and the outer sleeve.

The outer sleeve 22, as shown in FIGS. 6 and 7, has an upper end 30 and a lower end 32. Further, the outer sleeve 22 has an exterior surface 34 and an interior surface 36. The lower end 32 of the outer sleeve 22 is tapered or is an inverted cone shape and has a plurality of slot openings 38. The slot openings 38 have a greater dimension along the axis of the sleeve 22 than the dimension of the width around the circumference. The slot openings 38 are located in the tapered lower end 32 of the sleeve 22. In the preferred embodiment, there are six openings 38, each located at about 60° around the circumference of the lower end 32 of sleeve 22. On the interior surface 36 of sleeve 22 is a cam ring 40 located above the openings 38. At the extremity of the lower end 32 are a plurality of v-cuts 42 which have the apex of the vee toward the upper end 30 of sleeve 22. The inner surfaces of the v-cuts 42 are the second of the torque surfaces and interact with the torque surface of the fitting 10, namely, the pins 14 to prevent rotation. In the preferred embodiment, there are six vee cuts 42, each located at about 60° around the circumference of the lower end 32 of sleeve 22 and spaced between the openings 38. Alternatively, if indentions or dimples are on the lower portion 11 of the fitting 10, the lower end 32 of outer sleeve 22 will have protrusions or a counterpart torque reaction surface to provide anti-rotation of the sleeve 22 with respect to the fitting 10. The function of the openings 38 and the cam ring 40 will be explained in more detail hereinafter.

The inner sleeve 26, as shown in FIG. 7, moves within outer sleeve 22. The inner sleeve 26 has an upper end 50 and a lower end 52. At the lower end 52 of inner sleeve 26 are a plurality of slots 54 (see FIG. 8) which extend from the lower extremity of the inner sleeve 26. In the preferred embodiment, there are six slots 54, each located at about 60° around the circumference of the lower end 52 of inner sleeve 26 and which when assembled within outer sleeve 22 will align with slot openings 38 in the outer sleeve 22. Within each slot 54 is preferably a pin 56 which is essentially perpendicular to the axis of the tool 20. Each pin 56 spans a slot 54 and supports a latch or latching collet 58 which rotates on the pin 56. The rotation of the latches 58 will, as described in more detail hereinafter, rotate at their lower end out of the slot openings 38 of the outer sleeve 22. It is understood that the latches 58 need not be supported by a pin but may be supported by shoulders within the slots 54, or the latches may be dogs or other rotating structures secured to the lower end 52 of inner sleeve 26. In the embodiment illustrated, one side of each latching collet 58 is cavitated and has a pin 59 on which an L-shaped locator 60 is rotatably mounted. Between the latching collet 58 and locator 60 is a spring 62.

The latching collets 58 have an S-shaped body having an upper portion 64 with a flat surfaced head 66. Further, the upper portion 64 of the S-shape is short and the outside surface 68 thereof conforms to the shape of the surface of the cam ring 40 of the outer sleeve 22. The bodies of the latching collets 58 have a lower portion 70. The lower portion 70 is of triangular shape and has a flat surface 72 on the inner part of the S-shape. Extending from the body of the latching collet 58 at the location of the pin 59 is an indicator 74.

The locators 60 are L-shaped bodies with a top portion 76 and a bottom portion 78 which in the preferred embodiment has an included angle of about 135°.

The spring 62 is mounted on pin 59 between the latching collets 58 and the locators 60. One end 80 of the spring 62 is held by the surface 82 of the locator 60. The other end 84 of the spring 62 is held by a pin 86 on the cavitated portion of the latching collet 58. The spring 62 holds the locator 60 from freely rotating on the pin 59. In the preferred embodiment, the body of the locator 60 is hollowed such that spring 62 is housed within the hollowed portion 88.

Figure 8:
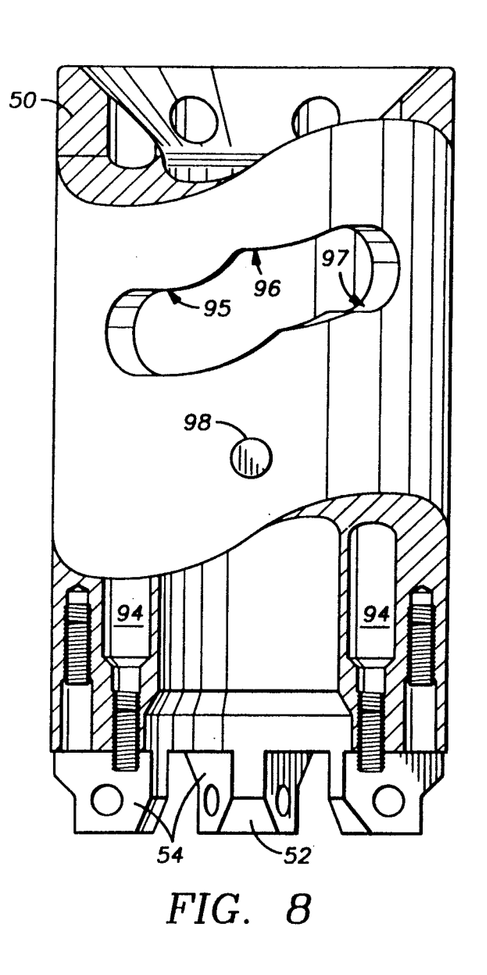
FIG. 8 is a partial cross-sectional side view of the inner sleeve showing the cam surface which raises and lowers the inner sleeve within the outer sleeve.

Immediately above each slot 54 in the inner sleeve 26, as shown in FIGS. 7 and 8, are two spring loaded set screws 90 and 92 which bias against flat head 66 of the latching collet 58. The outside set screws 90 are preloaded or set before the latching collets 58 are assembled. The inside set screws 92 are adjustable by access through the openings 94 in the body of the inner sleeve 26 after assembly of the latching collets 58 on the pins 56 of the inner sleeve 26.

Referring now to FIG. 8, the inner sleeve 26 is shown without the latching collets 58 or the set screws 90 or 92 but does show the details for these elements. The lower end 52 of the inner sleeve 26 is shown; also, the slots 54 are shown including the holes in which the pins 56 are placed for rotatably mounting the latching collets 58. Also shown is the cam surface on the outer surface of inner sleeve 26, the surface consisting of or having a lowest position 95, an intermediate position 96 and a highest or raised position 97. Below the cam surface 95, 96, 97 is a pin 98. The function of the cam surface 95, 96, 97 and pin 98 will be set forth in more detail hereinafter.

Figure 9:
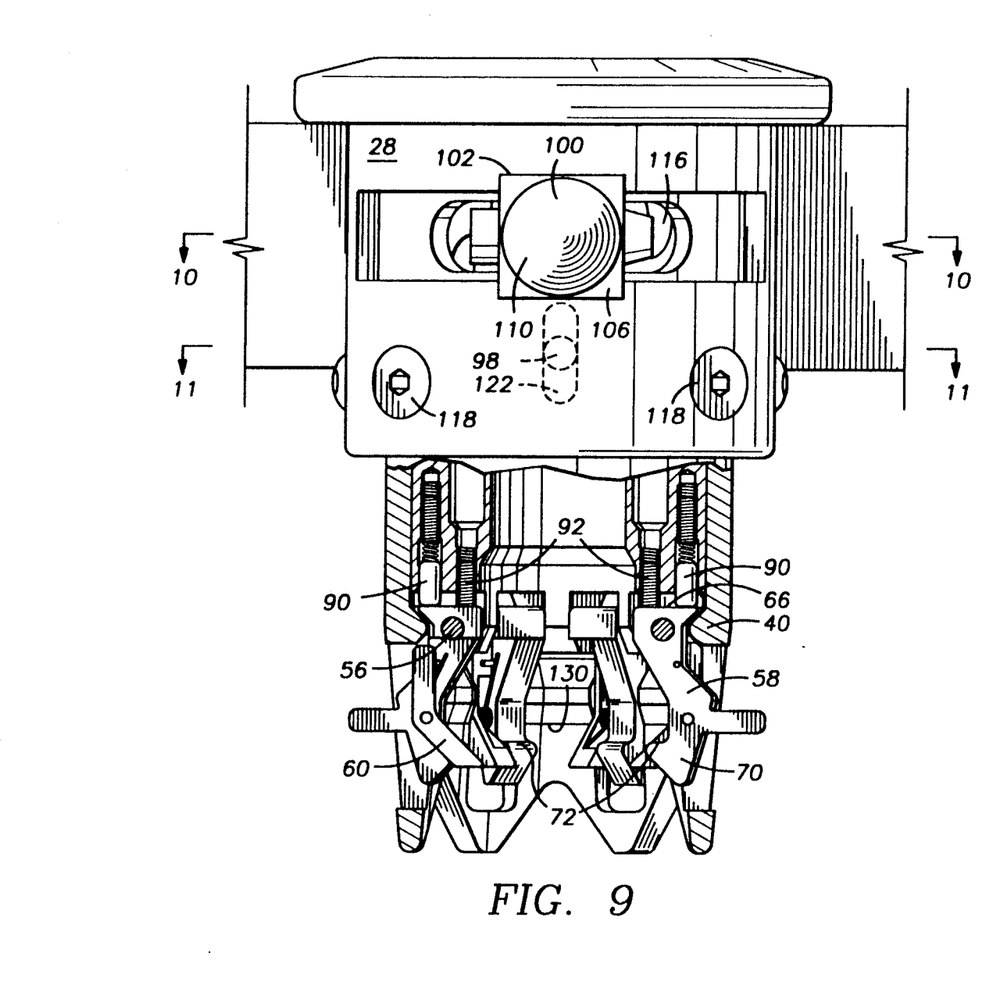
FIG. 9 is a partial cross-sectional side view of the interface tool showing the handle for raising and lowering the inner sleeve.
Figure 10:
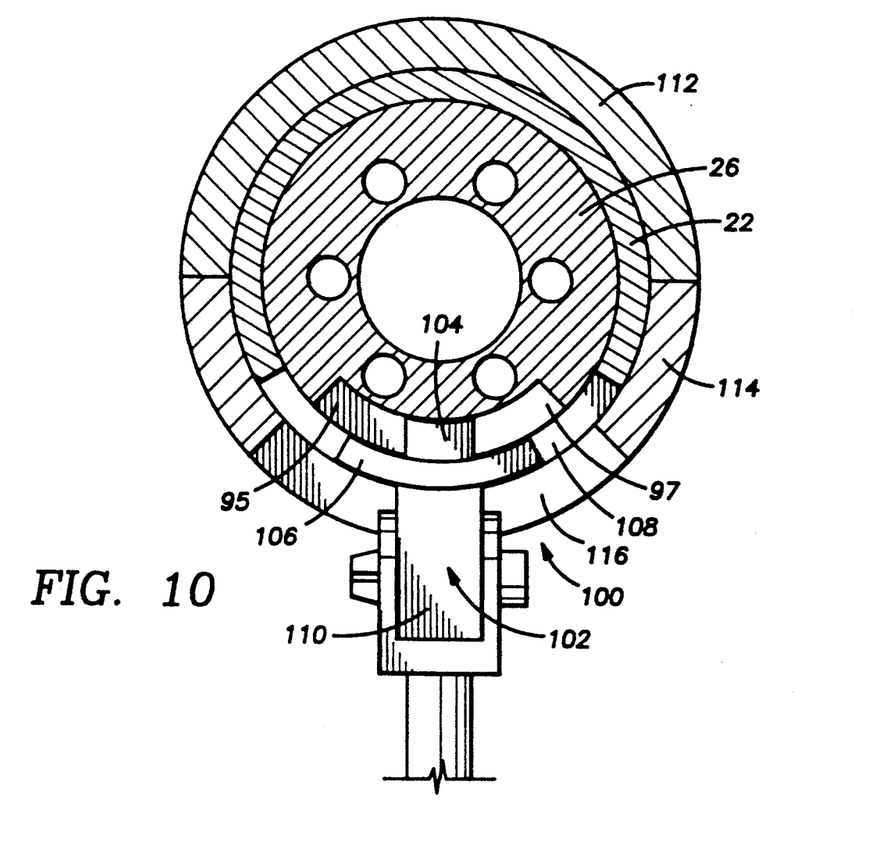
FIG. 10 is a cross-sectional view taken along the line 10—10 of FIG. 9 showing the handle assembly with the cam follower pin in the cam surface of the inner sleeve.
Figure 11:
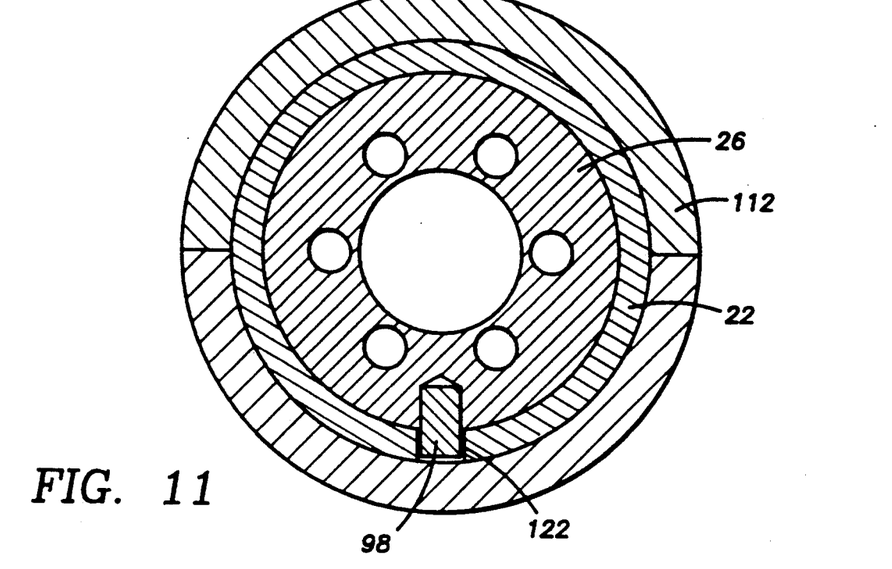
FIG. 11 is a cross-sectional view taken along line 11—11 of FIG. 9 showing the pin of the inner sleeve in the slot in the outer sleeve.

The inner sleeve 26 is raised and lowered within the outer sleeve 22 by the cam assembly means 100, shown in FIG. 9. The cam assembly means 100 includes the S-shaped cam surface 95, 96, 97 in the outer surface of the inner sleeve 26. A cam follower 102, preferably made of a single piece, has a cam follower pin 104 which rides in the cam surface 95, 96, 97 in the outer surface of inner sleeve 26; a plate 106 which moves in an opening 108 of the outer sleeve 22; and an actuator 110 which can be moved to the left to raise the inner sleeve 26, to an inter-mediate position (as shown in FIGS. 9 and 10) or to the right which lowers the inner sleeve 26 within the outer sleeve 22. The cam follower 102 is maintained on the tool 20 by a two piece cam follower shroud 112. The front piece 114 of the shroud 112 has a horizontal slot 116 for the actuator 110 and when placed over the cam follower 102 is screwed to the outer sleeve 22 by screws 118. The shroud 112 holds the cam follower 102 in place and only permits the cam follower 102 to be moved in a horizontal direction with relation to the outer sleeve 22. The direction of the horizontal movement either raises (left) or lowers (right) the inner sleeve 26 within the outer sleeve 22. Below the cam follower 102 and in the inner sleeve 26 is a pin 98, shown in FIGS. 8, 9 and 11. As shown in FIG. 11, the pin 98 is press fit into the inner sleeve 26. The pin 98 moves within a slot 122 in the outer sleeve 22 which prevents rotation of the inner and outer sleeves relative to one another.

Referring now to FIG. 9, the intermediate position of the cam follower 102, as shown, is referred to as the capture position. The inner sleeve 26 is positioned with respect to outer sleeve 22 such that the pins 56 of the latching collets 58 on the inner sleeve 26 are at the same level as the cam ring 40 on the interior surface of outer sleeve 22. The interior termination of the flat surface 72 of the lower portion 70 of the collets 58 which are essentially perpendicular to the axis of the sleeve 26 define a diameter which is slightly less than the diameter of the upper portion 13 of the microconical fitting 10. Thus, when contact with the fitting 10 occurs, the lower portion 70 of that latching collet 58 is rotated outwardly under the tension of the set screws 90 and 92. This tension is very small; but the contact of the latches 58 of the tool 20 with the fitting 10 is known by the rotation of the locator 60 and the latching collet 58, and a soft docking or capture is accomplished when all the latching collets 58 pass over the upper portion 13 and are held by the tension of lock screws 90 and 92 against locking surface 18. A unique feature of the present invention is that the soft docking or capture does not require precise alignment of the tool 20 with the microconical fitting 10. As will be illustrated in FIGS. 13 through 24 hereinafter, the tool 20 can be aligned and finally latched by moving the cam follower 102 to the left or locked position. When the cam follower 102 is moved to the locked position, the inner sleeve 26 is raised so that the cam ring 40 is below the pins 56 and is abutting the outside upper portion 64 of each collet 58. The latching collets 58 can not rotate in this position and the interior termination of the flat surface 72 of the lower portion 70 of the collets 58 define the smallest diameter which locks the latching collets 58 against the locking surface 18 of the microconical fitting 10. When the cam follower is moved to the extreme right or unlocked position, the inner sleeve 26 is lowered so that the flat surface head 66 is moved by cam 40 to rotate the lower portion 70 of latching collets 58 outwardly. At this position the interior termination of the flat surface 72 of the lower portion 70 of the collets 58 define the largest diameter which unlocks the latching collets 58 from the microconical fitting 10 and is a diameter greater than the largest diameter of the upper portion 13 of fitting 10.

This cam assembly arrangement is only one possible arrangement, designed primarily for extra vehicular activity, but may be modified for robot use by having an interior screw as the cam which will raise or lower the inner sleeve.

Another feature of the preferred embodiment shown is that the inner surface of the lower tapered end 32 of the outer sleeve 22 is not a flat tapered surface. Referring to FIG. 9 (also shown in FIG. 7), the surface 130 is of a reduced diameter such that when the outer sleeve 22 of the tool 20 passes over the upper portion 13 of the fitting 10, the vee cuts 42 will engage the protrusions 14. The sleeve 22 will rotate to accommodate the protrusions 14 and will pas over the fitting 10 until the surface 130 on the inner surface of sleeve 22 engages the upper portion 13. Thus, the contact of the surface 130 with the upper portion 13 of fitting 10 provides an indication that the tool 20 and the fitting 10 are engaged.

Figure 12:
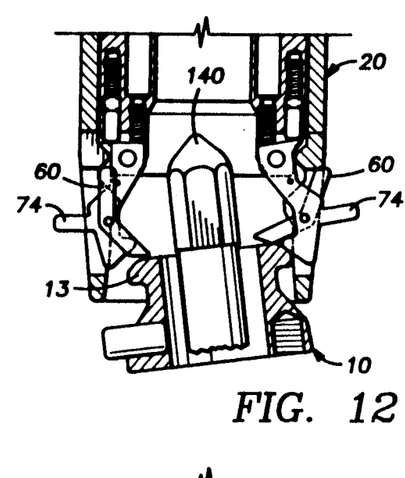
FIGS. 12-23 show the latching and unlatching sequence of the interface tool and the microconical interface fitting of the present invention.
Figure 13:
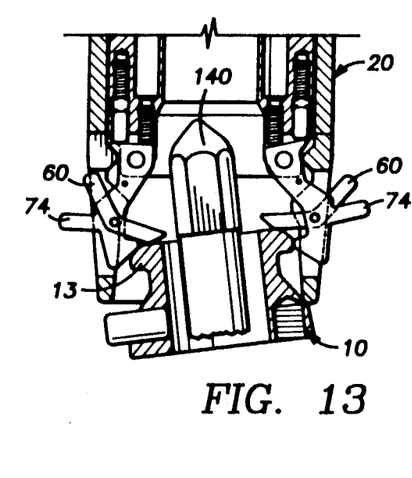
Figure 14:
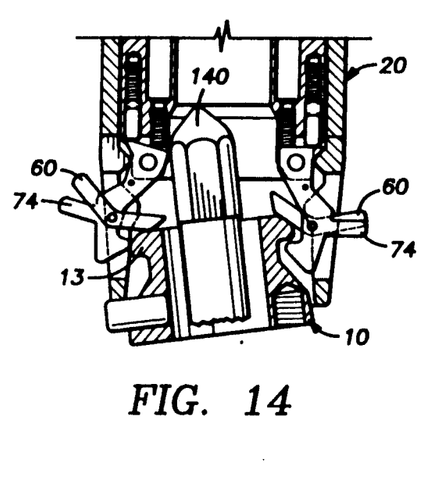
Figure 15:
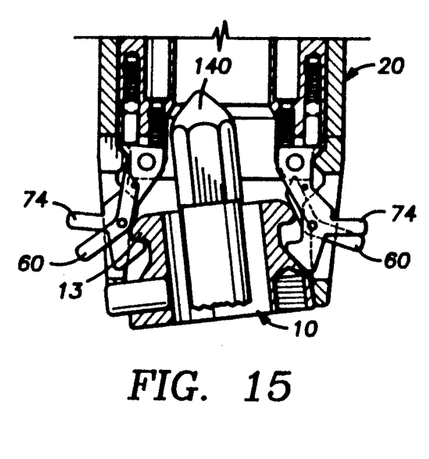
Figure 16:
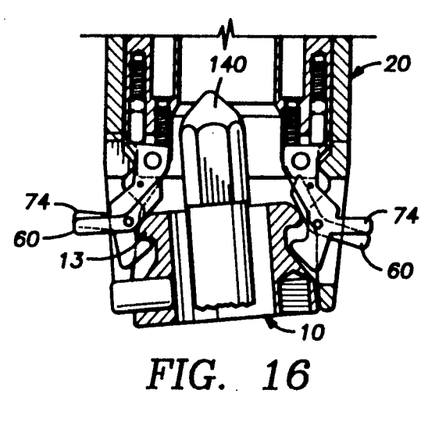
Figure 17:
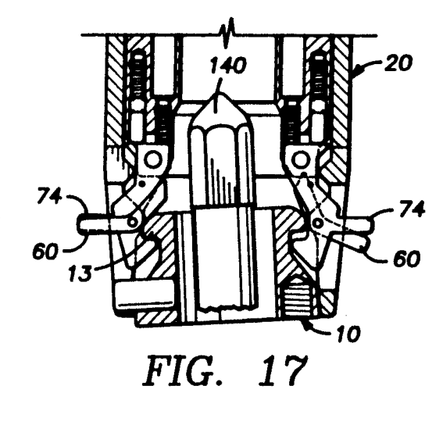
Figure 18:
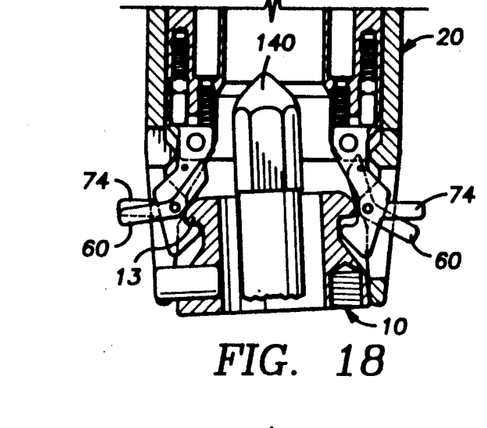
Figure 19:
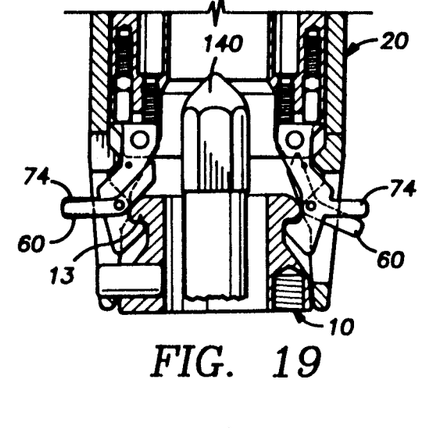

Referring to FIGS. 12 through 23, the capture of the fitting 10 by the tool 20 is shown in FIGS. 12-14. The first step in the capture may be placing a bolt or an alignment piece 140 into the opening 17 of the microconical fitting 10, although it is understood that such a piece is not necessary. The cam assembly 28 in FIG. 6 or 100 in FIG. 10 is in the intermediate or capture position and pins 56 are at the same level as the cam ring 40. The initial contact of the tool 10 is shown by movement of locator 60, as shown in FIG. 12. In FIG. 14, the alignment of locator 60 with the indicator 74 on the latching collet 58 shows that the surface 72 of the latching collet 58 is below the upper portion 13 and the locking surface 18 of the microconical fitting 10. FIG. 15 shows the soft dock of the tool 20 on the fitting 10. This positioning of the soft dock is unique since it does not require alignment of the tool 20 to the fitting 10. In this position the locator 60 is below the indicator 74.

Figure 20:
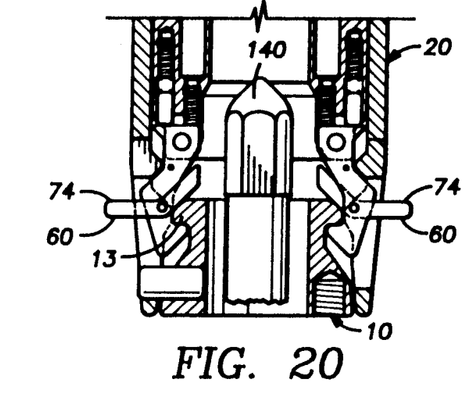

The cam follower 102 is moved to the locking position by moving the actuator 110 (which may have a handle attached as shown in FIG. 10) to the left which raises inner sleeve 26 with respect to outer sleeve 22. In this position pin 56 is raised above cam ring 40 and the latching collets 58 are cammed inwardly. FIGS. 16 through 19 show the raising of the inner sleeve 26 and the raising of the latching collets 58 being drawn into contact with the surface 18. During this operation, the alignment of the tool 20 and the microconical fitting 10 is accomplished. FIG. 20 shows the locked position of the tool 20 and fitting 10.

Figure 21:
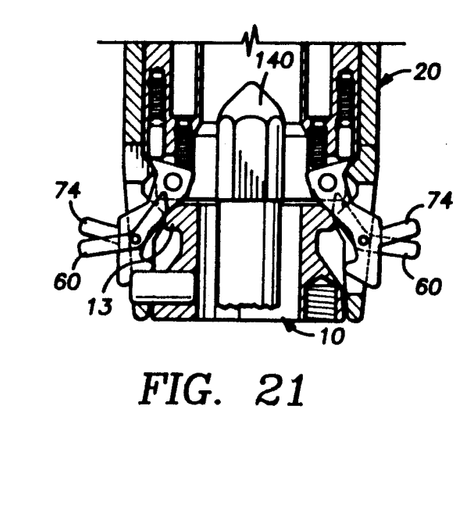
Figure 22:
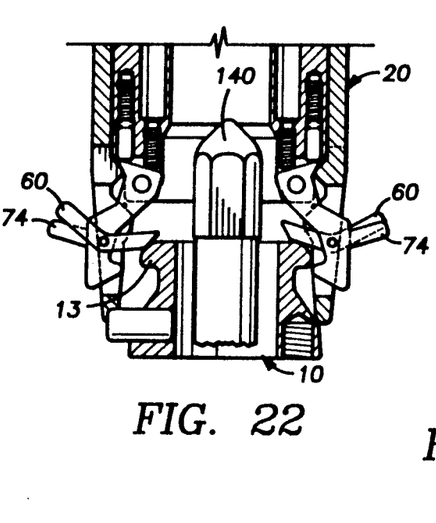
Figure 23:
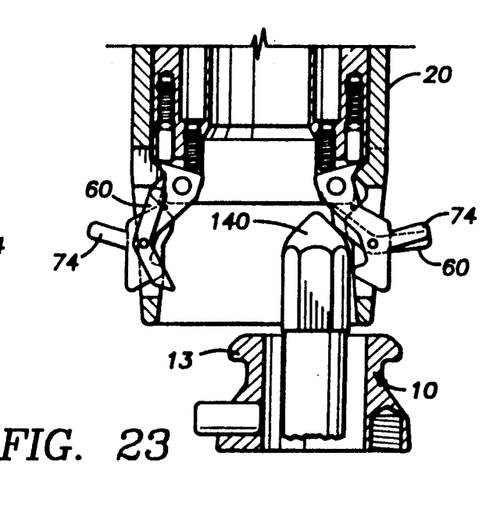

To remove the tool 20 from the fitting 10, the cam follower 102 is moved by the actuator 110 to the extreme right or unlocked position. In this position, the pins 56 are lowered below the cam ring 40 and the latching collets are cammed outwardly. FIGS. 21, 22 and 23 show the tool 20 in the unlocked position which moves the latching collets 58 free of the fitting 10.

We claim:

1. A microconical interface fitting for use with an interface grasping tool having a plurality of latches comprising:
   an axisymmetrical conical body, said body having (1) a base portion with a torque reaction surface to prevent rotation of said interface tool, (2) a cavitated intermediate locking portion which has a cavity shaped to receive the latches of said tool and (3) an upper guiding portion which guides the latches over said upper portion and terminates in a surface essentially perpendicular to the axis of said body against which the latches are locked, said torque reaction surface being at the top of said base portion adjacent said cavitated intermediate locking portion.

2. A microconical fitting according to claim 1 wherein said upper guiding portion is truncated.

3. A microconical fitting according to claim 2 having an axial opening extending into said fitting.

4. A microconical fitting according to claim 3 having means for attachment to another object.

5. A microconical interface according to claim 2 wherein said torque surface includes at least one protrusion.

6. A microconical interface according to claim 5 wherein said truncated upper guiding portion is beveled.

7. A grasping tool comprising:
   an outer sleeve having an upper and a lower end and an exterior and interior surface, having a plurality of openings and torque reaction surfaces at said lower end and having cam means on said interior surface above said openings;
   means at said upper end of said outer sleeve for holding said outer sleeve;
   an inner sleeve having an upper and lower end and movable within said outer sleeve, a plurality of latches rotatably supported at said lower end of said inner sleeve whereby said latches are rotatable from a position forming a minimum diameter opening to maximum diameter opening; and
   means to lower and raise said inner sleeve within said outer sleeve whereby at the lowest position of said inner sleeve said latches are biased open to form said maximum diameter opening and at the highest position of said inner sleeve said latches are held fixed to form said locking, minimum diameter opening.

8. A grasping tool according to claim 7 wherein said means to raise and lower said inner sleeve is a cam follower including a cam follower pin maintained at a fixed level of said outer sleeve and an S-shaped cam surface on said inner sleeve having a high point at one end and a low point at the other end, and a handle being movable horizontally at said fixed level of said outer sleeve to move said cam follower pin on said cam surface to raise and lower said inner sleeve within said outer sleeve.

9. A grasping tool according to claim 8 which further includes a shroud surrounding said cam follower which holds the cam follower pin in the cam surface of said inner sleeve and a pin on said inner sleeve which moves within a vertical opening in said outer sleeve to prevent relative rotation of said outer sleeve as said inner sleeve is raised and lowered.

10. A grasping tool according to claim 8 wherein said lower end of said outer sleeve is tapered.

11. A grasping tool according to claim 10 wherein said openings are equally spaced in said lower tapered end and said torque reaction surfaces are vee cuts spaced between said openings.

12. A grasping tool according to claim 11 wherein said inner sleeve has a plurality of slots at the lower end with a pin for rotatably mounting said latches.

13. A grasping tool according to claim 12 wherein said slots and latches on said inner sleeve are of the same number and are aligned with said openings in said lower tapered end of said outer sleeve.

14. A grasping tool according to claim 8 wherein said cam follower further includes a plate and an actuator.

15. A grasping tool according to claim 14 wherein said handle is attached to said actuator.

16. A microconical interface fitting and a grasping tool for securing equipment which comprises:
- an axisymmetrical conical body which is attached to said equipment, said body having a base portion with at least three protrusions to capture and prevent rotation of said grasping tool, a cavitated intermediate locking portion which has a cavity shaped to receive the latches of said tool and an upper guiding portion which guides said latches over said upper portion and terminates in a surface essentially perpendicular to the axis of said body against which said latches are locked; and
- said grasping tool comprising:
- an outer sleeve having an upper and a lower end and an exterior and interior surface, a plurality of openings at said lower end and inverted vee cuts at said lower end which engage said protrusions on said base portion of said axisymmetrical conical body and having cam means on said interior surface above said openings;
- means at said upper end of said outer sleeve for holding said outer sleeve;
- an inner sleeve having an upper and lower end and movable within said outer sleeve, a plurality of latches rotatably supported at said lower end of said inner sleeve whereby said latches are rotatable from a position forming a minimum diameter opening to maximum diameter opening; and
- means to lower and raise said inner sleeve within said outer sleeve whereby at the lowest position of said inner sleeve said latches are biased open to form said maximum diameter opening and at the highest position of said inner sleeve said latches are held fixed to form said locking, minimum diameter opening.

17. A microconical fitting and a grasping tool according to claim 16 wherein said means for holding said outer sleeve is a handle.

18. A microconical fitting and grasping tool according to claim 16 wherein said inner sleeve has a plurality of slots at the lower end with a pin for rotatably mounting said latches.

19. A microconical fitting and a grasping tool according to claim 16 wherein all said latches are below said upper guiding portion of said fitting wherein an unconstrained soft capture occurs without axial alignment of said fitting and said tool.

* * * * *